US005532891A

United States Patent [19]

Tsujino

[11] Patent Number: 5,532,891
[45] Date of Patent: Jul. 2, 1996

[54] DISK DRIVE APPARATUS

[75] Inventor: Hitoshi Tsujino, Tokyo-to, Japan

[73] Assignee: International Business Machines Corporation, Armonk, N.Y.

[21] Appl. No.: 461,088

[22] Filed: Jun. 5, 1995

Related U.S. Application Data

[62] Division of Ser. No. 176,406, Jan. 3, 1994, Pat. No. 5,483,400, which is a division of Ser. No. 731,587, Jul. 17, 1991, Pat. No. 5,315,464.

[30] Foreign Application Priority Data

Jul. 20, 1990  [JP]  Japan ................... 2-190878

[51] Int. Cl.$^6$ .......................... G11B 5/54; G11B 33/12
[52] U.S. Cl. ......................... 360/106; 360/97.01
[58] Field of Search ..................... 360/104, 105, 360/106, 137, 97.01, 98.01

[56] References Cited

U.S. PATENT DOCUMENTS 4,700,246  10/1987  Luoma et al. ................ 360/98
4,985,792  1/1991  Moir ........................ 360/99.08
5,179,482  1/1993  Tanaka et al. ............... 360/97.01
5,195,002  3/1993  Sakurai .................... 360/99.08
5,315,467  5/1994  Yoshida .................... 360/106

FOREIGN PATENT DOCUMENTS 59-45662  3/1984  Japan .
64-07382  1/1989  Japan .

*Primary Examiner*—Stuart S. Levy
*Assistant Examiner*—Paul J. Ditmyer
*Attorney, Agent, or Firm*—Richard E. Billion; Matthew J. Bussan; Roy W. Truelson

[57] ABSTRACT

Disclosed is a disk drive for storing representations of data. The disk drive includes a housing or enclosure. At least one disk is rotatably attached to the housing. Also attached to the housing is an actuator. A transducing head is attached to one end of the actuator and is positioned to pass near the disk. Attached on the other end of the actuator is a coil which makes up a portion of a voice coil motor. Another portion of the voice coil motor is a magnet positioned near the coil. The housing includes at least one recess or opening which holds the magnet on the outside of the housing yet near the coil.

4 Claims, 4 Drawing Sheets

DISK DRIVE APPARATUS

CROSS REFERENCE TO RELATED APPLICATIONS

This is a divisional of application Ser. No. 08/176,406 filed on Jan. 3, 1994 issued Jan. 9, 1996 as U.S. Pat. No. 5,483,400 which is a divisional of Ser. No. 07/731,587, filed Jul. 17, 1991 (issued May 24, 1994 as U.S. Pat. No. 5,315,464).

BACKGROUND OF THE INVENTION

1. Field of the Invention

The present invention relates to a disk apparatus which drives a head supporting carriage by a voice coil motor.

2. Prior Art

A magnetic hard disk drive apparatus drives a head supporting carriage by a voice coil motor (VCM) to meet a demand of high speed writing and reading. The voice coil motor has a coil connected to the carriage, and a magnet which supplies magnetic flux to the coil. The carriage moves as a current flows through the coil. The coil and magnet are included in an enclosure surrounding a magnetic disk, a head, and the carriage, as shown in FIG.6 and FIG.9 of Japanese Published Unexamined Patent Application No.59-45662.

The surface of the magnet of the voice coil motor is magnetic so that minute particles such as dust etc. stick easily. Also, magnetized particles stick easily to the magnetic disk and magnetic head, and when those particles stuck to the disk peel off, the information recorded on the disk may be destroyed.

U.S. Pat. No. 4,700,246 discloses that a disk and a head are isolated from the magnet by providing an enclosure solely for a voice coil motor, which is separate from an enclosure surrounding the disk and head, to isolate the magnet from the coil of the voice coil motor. The enclosure solely for the voice coil motor is comprised of a cylindrical sleeve with a fringe, a collar with cylindrical projection, a VCM housing cap, and a VCM housing cap seal.

U.S. Pat. No. 4,700,246 requires that many independent parts such as the cylindrical sleeve with a fringe are provided separately to insulate the disk and head from the VCM magnet.

Further, the aforementioned technique disclosed in U.S. Pat. No. 4,700,246 for isolating the disk and head from the VCM magnet is not applicable to a head actuator using what is called rotary VCM which a head supporting carriage is pivotally supported with respect to a predetermined point and current flowing through the coil causes the carriage to pivot with respect to the predetermined point.

SUMMARY OF THE INVENTION

A first object of the present invention is to provide a disk apparatus capable of isolating a magnet of a voice coil motor (VCM) from a disk and a head, without requiring independent parts provided separately.

A second object of the present invention is to provide a technique of isolating a disk and a head from a VCM magnet applicable to a disk apparatus having a head actuator using the rotary VCM.

A third object of the present invention is to provide a simple method for manufacturing a disk apparatus which is capable of isolating a disk and a head from a VCM magnet.

According to the present invention, to reach the aforementioned first and second objects, an enclosure is constructed to envelop not only a disk, a head, and a head supporting carriage but also a coil connected to the carriage, and the magnet is positioned outside of the enclosure so that the magnet is opposite to the coil in the enclosure.

Further, according to a first method of the present invention for manufacturing a disk apparatus, first an enclosure assembly the whole of which is composed of the same material is made, next, after a disk, a head, a carriage, and a coil are arranged at predetermined positions in the enclosure assembly, and then a magnet is positioned outside of the enclosure assembly so that the magnet is opposite to the coil.

Further, according to a second method of the present invention for manufacturing a disk apparatus, first an enclosure assembly having an opening where a coil is to be placed is made, next, after a disk, a head, a carriage, and a coil are arranged in predetermined positions in the enclosure assembly, then the opening of the enclosure assembly is covered with a thin film sheet, and last, a magnet is positioned outside of the enclosure assembly so that the magnet is opposite to the coil.

The enclosure opening can be covered with the thin film sheet before placing the disk, etc. in the enclosure assembly.

The disk apparatus of the invention does not require independent parts separately because the enclosure of the disk, head, and carriage itself isolates the disk and the head from the magnet.

Also, the present invention is applicable to a disk apparatus having a head actuator using the rotary VCM because the enclosure of the coil is the enclosure of the disk and head, and it does not interfere with pivoting of the coil. The aforementioned U.S. Pat. No. 4,700,246 can not be applied to a disk apparatus using the rotary VCM because the coil is surrounded by a cylindrical sleeve, therefore, the coil can move in the direction of the cylindrical sleeve axis, but it can not move the direction which crosses the cylindrical sleeve axis.

DETAILED DESCRIPTION OF THE PREFERRED EMBODIMENT

Figure 1:
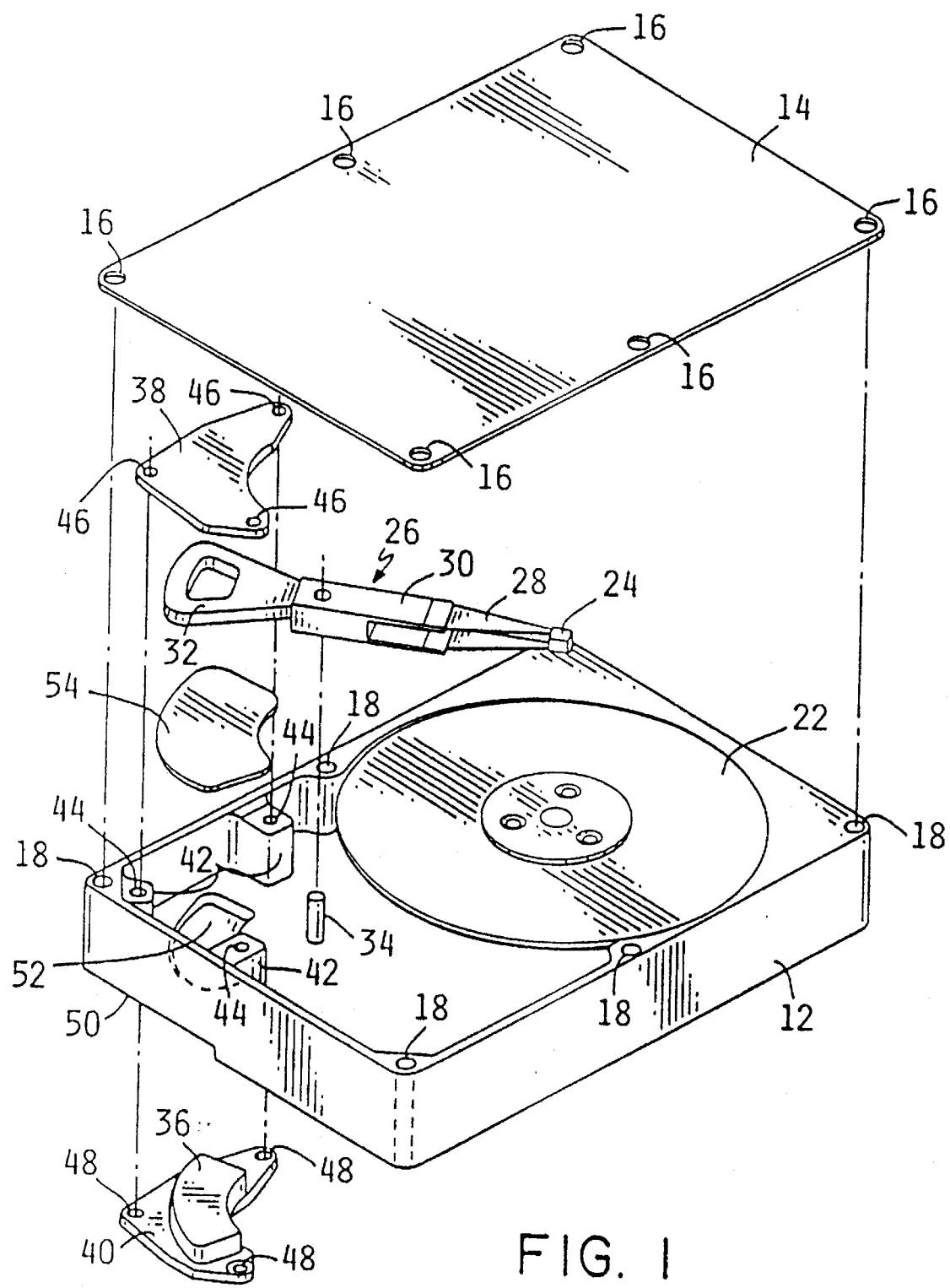
FIG. 1 is an exploded perspective view showing one embodiment of a magnetic hard disk apparatus according to the present invention.
Figure 2:
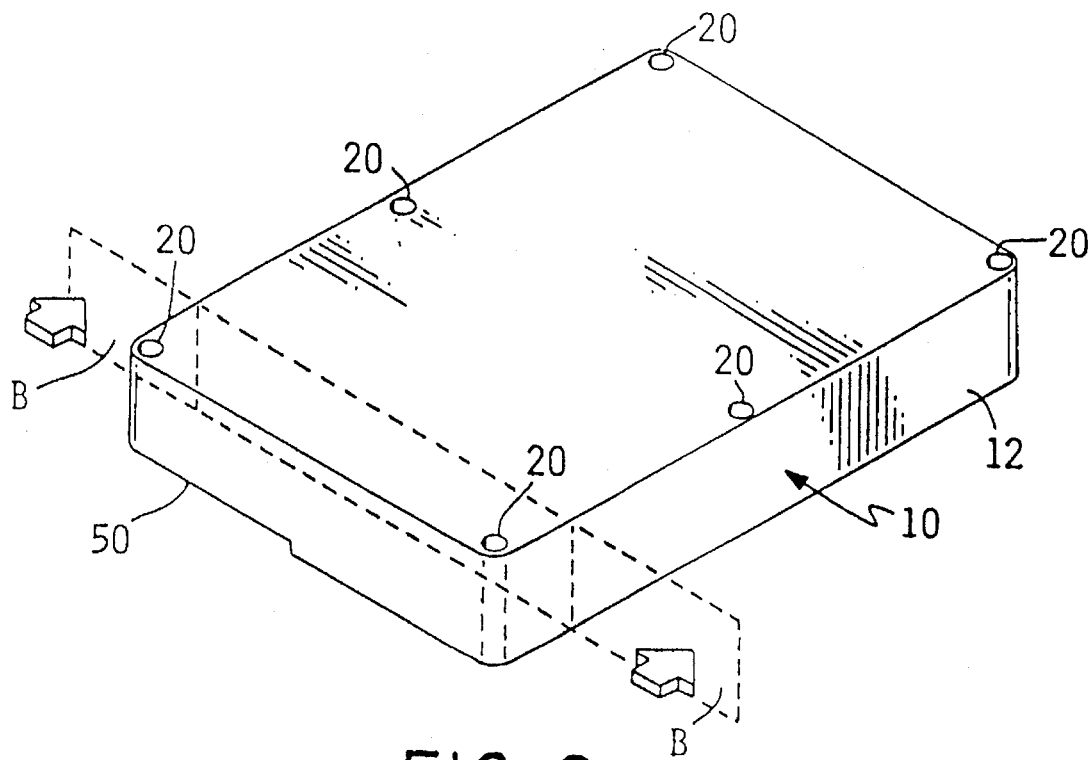
FIG. 2 is a perspective view showing an appearance of the magnetic hard disk apparatus of FIG. 1.
Figure 3:
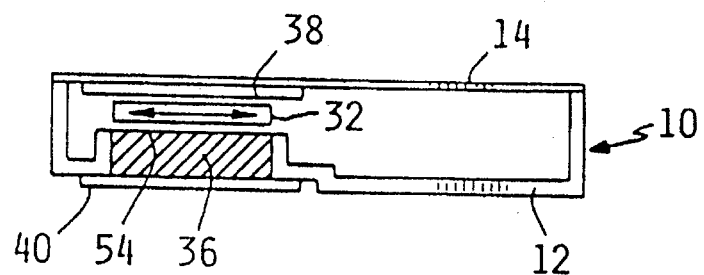
FIG. 3 is a cross-sectional view of FIG. 2 along plane B.

FIG. 1 is an exploded perspective view which shows one embodiment of a magnetic hard disk apparatus according to the present invention, FIG. 2 is a perspective view which shows an appearance of the magnetic hard disk apparatus of FIG. 1, FIG. 3 is a cross-sectional view of FIG. 2 along plane B. Now referring to these figures, an enclosure 10 is composed of an bottom casing 12 and an upper cover 14 both of which are aluminum die-casted. Holes 16 are formed at six points on edges of the upper cover 14, and also holes 18 are formed at six points corresponding to those holes 16 in edges of the bottom casing 12. The holes 18 are threaded. The upper cover 14 is fixed to the bottom casing 12 by threaded bolts 20 which are fitted into the holes 18 through the holes 16.

The magnetic hard disk 22 is fixed onto a hub of a spindle motor (not shown) which is fixed to the bottom casing 12, and is rotated by the spindle motor. Heads 24 which read and write one the magnetic hard disk 22 are supported by a carriage 26. The carriage 26 has a suspension 28. At the apex of the suspension 28, the head 24 is mounted. An arm 30 supports the suspension 28. The arm 30 is connected to a coil 32 which is one component of a voice coil motor (VCM).

The carriage 26 is pivotally mounted through a bearing (not shown) to a pivot 34 fixed on the bottom casing 12. The carriage 26 rotates with respect to the pivot 34 as current is supplied to the coil 32 in the magnetic field produced by a flat magnets 36. The flat coil magnet is another component of VCM. This makes the head 24 seek or follow a required track on the disk 22.

The path of the magnetic flux that is produced by the magnets 36 is determined by an upper yoke 38 and a lower yoke 40 which are made of material of a high magnetic permeability such as iron. In the area covered by the movement of the coil 32 of the bottom casing 12, three yoke holding projections 42 are formed. Threaded through holes 44 are formed through each of the yoke holding projections 42. Holes 46 and 48 are formed through the upper and lower yokes 38 and 40, at positions corresponding to the through holes 44 of the yoke holding the projections 42 of the bottom casing 12.

On the top of the lower yoke 40, namely the coil side 32 of the lower yoke 40, the permanent magnet 36 is fixed. In the area of the bottom casing 12 where the lower yoke 40 is placed, a recess 50 is formed which is recessed toward the inside of the bottom casing 12. The depth of this recess coincides with the height of the lower yoke 36. Further, an opening 52 is formed in the area where the magnets 36 are placed in the recess 50 of the bottom casing 12. This opening 52 is closed by adhering a thin film sheet 54 of non-magnetic material to the inside of the bottom casing 12. In the result, the thin film sheet 54 becomes a part of the enclosure 10.

The upper yoke 38 is fixed to the bottom casing 12 with threaded bolts which are fitted into the through holes 44 of the yoke holding projections through the holes 46 of the upper yoke 38. The height of the yoke holding projections 42 is set so that the upper yoke 38 is placed above the coil 32 at a fixed distance from the coil 32 as the upper yoke 38 is fixed to the bottom casing 12 as shown in FIG. 3. The lower yoke 40 is fixed to the bottom casing 12 with threaded bolts which are fitted into the through hole 44 of the yoke holding projections, through the holes 46 of the upper yoke 38.

In the condition where the lower yoke 40 is fixed to the recess 50 of the bottom casing 12, as shown in FIG. 3, the magnet 36 is opposed to the coil 32 so that the magnet 36 is able to supply the magnetic flux to the coil 32. Further, the magnet 36 is isolated from the coil 32 by the thin film sheet 54, in other words, the magnet 36 is isolated from the other components of the disk apparatus by the enclosure that surrounds the disk 22, head carriage 30, and coil 32, therefore particles such as dust will not be attracted by the magnets 36 to stick to the disk 22 or head 24. The chance of magnetized particles sticking to the disk, and the possibility of stored information on the disk being damaged are eliminated.

It is desired that the material used for the thin film sheet 54 would have a magnetic permeability equivalent to that of air, so as not to disturb the magnetic flux of the gap between the magnet 36 and the coil 32. Polyester, for example, is a good candidate for this material.

Further, the gap between the magnet 36 and the coil 32 will not increase the height of the magnetic hard disk apparatus because only the thin film sheet 54 is actually placed between the magnet 36 and the coil 32.

Furthermore, placing the magnet 36 outside the enclosure 10 will not increase the thickness of the magnetic hard disk apparatus because the magnet 36 is placed in a recess 50 of the bottom casing 12.

To manufacture or assemble the magnetic hard disk apparatus shown in FIGS. 1, 2, and 3, in a clean room, after covering the opening 52 of the bottom casing 12 with the thin film sheet 54, the disk 22, the spindle motor for driving this disk, the head 24, carriage 26, coil 32, and the upper yoke 38 are positioned in their predetermined positions, and the upper cover 14 is fixed onto the bottom casing 12.

Figure 4:
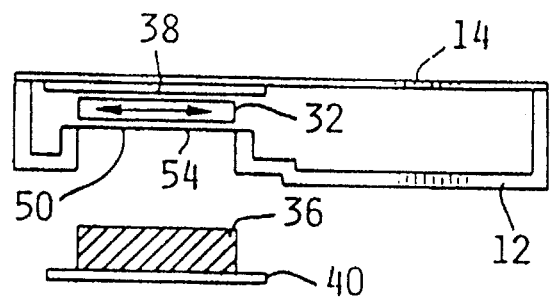
FIG. 4 is a cross-sectional view showing an assembly of the embodiment of FIG. 1, outside of a clean room.

Then, outside of the clean room, the magnet 36 and the lower yoke 40 are fixed in the recess 50 of the bottom casing 12, as shown in FIG. 4. This, therefore, eliminates the need to handle the magnets 36 in the clean room or any measures to be taken against dust, thus, and work efficiency increases.

It should be noted that covering the opening 52 of the bottom casing 12 may be done in the clean room after placing the disk 22 and other components in the bottom casing 12. In this case, a thin film sheet 54 may be adhered from the outside of the bottom casing 12.

Figure 5:
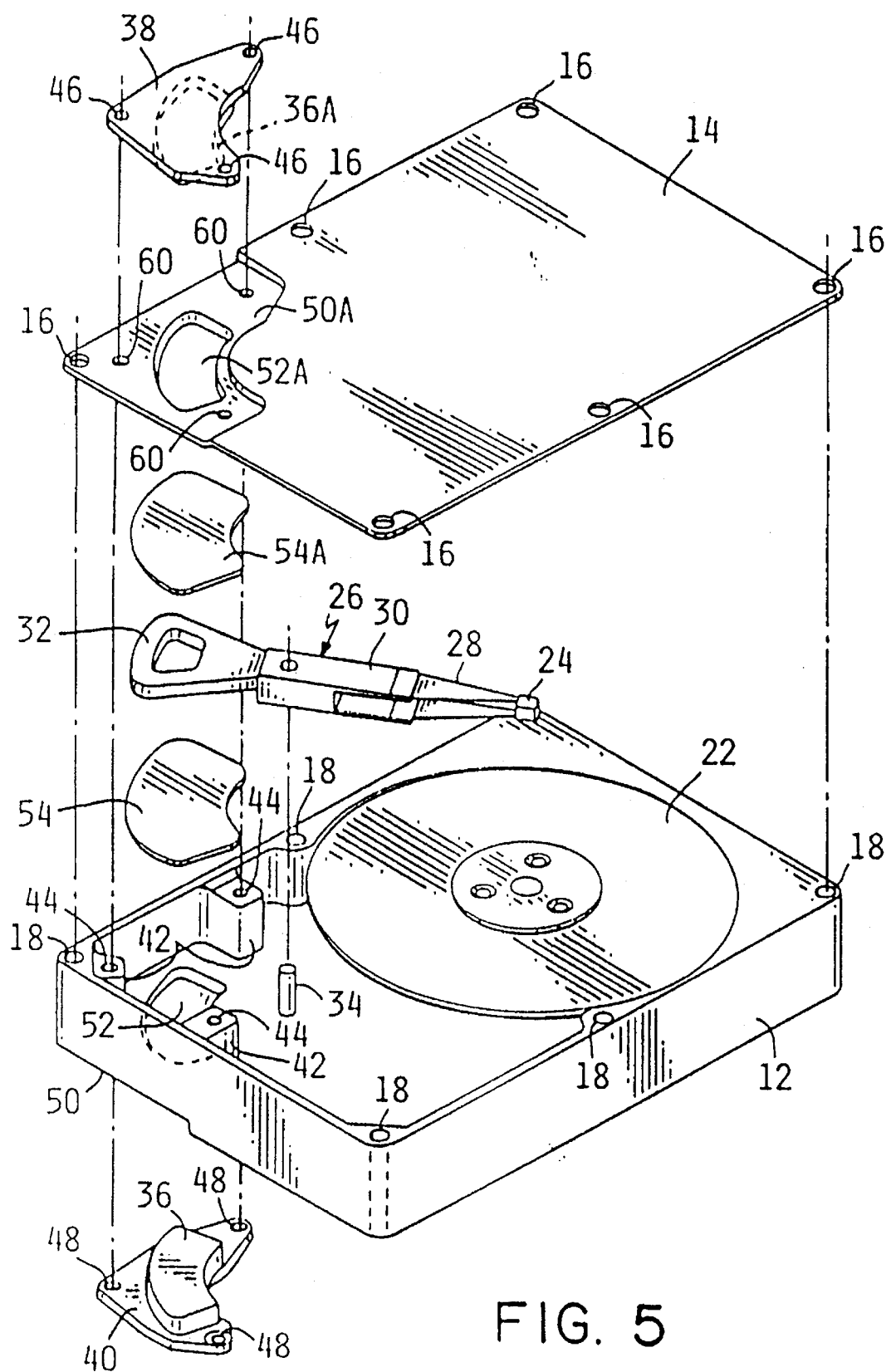
FIG. 5 is an exploded present view of another embodiment of a magnetic hard disk apparatus according to the present invention.
Figure 6:
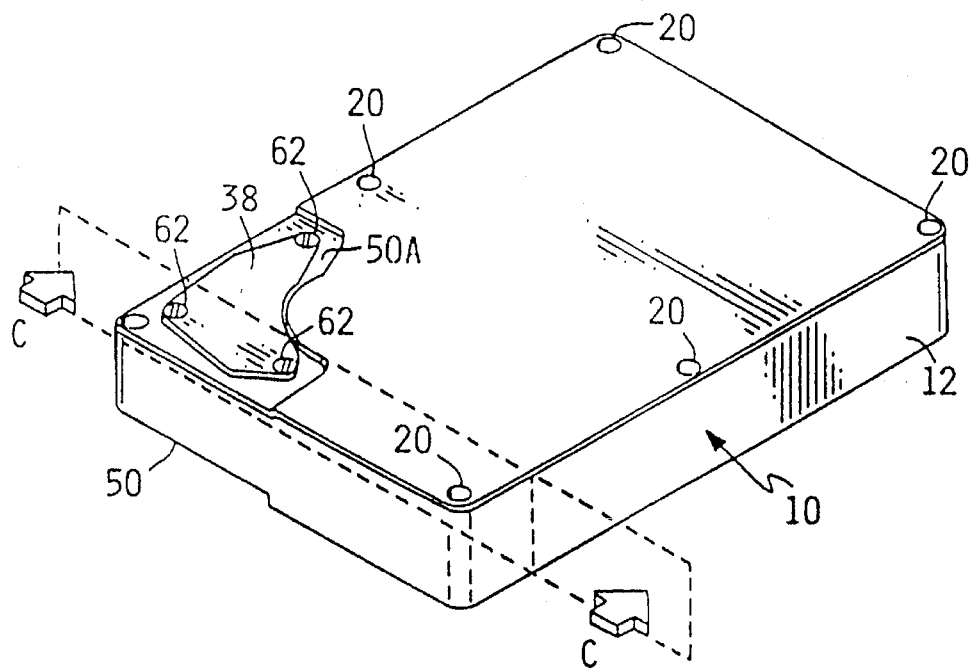
FIG. 6 is a perspective view showing an appearance of the magnetic hard disk apparatus of FIG. 5.
Figure 7:
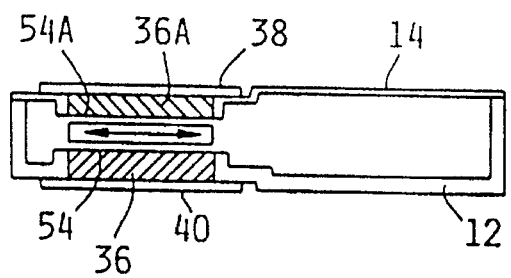
FIG. 7 is a cross-sectional view of FIG. 5 along plane C.

FIG. 5 is an exploded perspective view showing another embodiment of a magnetic hard disk apparatus of the present invention, FIG. 6 is perspective view showing an appearance of the magnetic hard disk apparatus of FIG. 5, FIG. 7 is a cross-sectional view of FIG. 6 along plane C. The embodiment shown in these figures uses a rotary VCM in which magnets are provided not only on one side but also on the other side of the coil. In FIGS. 4, 5, and 6, the components which are identical to the ones in FIGS. 1, 2, and 3, are assigned with an identical reference number, so their descriptions are omitted.

Referring to FIGS. 5, 6, and 7, a flat magnet 36A is fixed to the upper cover 14 side of the upper yoke 38. The permanent magnet 36A has the same shape and size as the magnet 36 which is fixed to the lower yoke 40. In the area of the upper cover 14 where the upper yoke 38 is placed, a recess 50A is formed which is recessed toward the inside of the cover 12. The depth of this recess 50A coincides with the height of the upper yoke 38. Further, an opening 52A is formed in the area where the magnet 36A is placed in the recess 50A of the upper cover 14 is placed. This opening 52A is closed by adhering a thin film sheet 54A of the same material as the thin film sheet 54, to the inside of the upper cover 14. As a result, the thin film sheet 54A also becomes a part of the enclosure 10.

Holes 60 are formed through the recess 50A at the positions corresponding to the through holes 44 of the yoke holding projection 42. The upper yoke 38 is fixed to the bottom casing 12 by threaded bolts 62 which are fitted into the thread of the through holes 44 of the yoke holding projection 42, through the holes 46 of the upper yoke 38, and through the holes 60 of the recess 50A of the upper cover 14.

In the condition where the upper and lower yokes 38 and 40 are respectively fixed to the recesses 50A and 50B of the upper cover 14 and the bottom casing 12, the magnets 36A and 36 are opposite to the coil 32, therefore they are able to supply magnetic flux to the coil 32, as shown in FIG. 7. Accordingly, by supplying current to the coil 32, the carriage 26 which is connected to the coil 32 can be moved.

Figure 8:
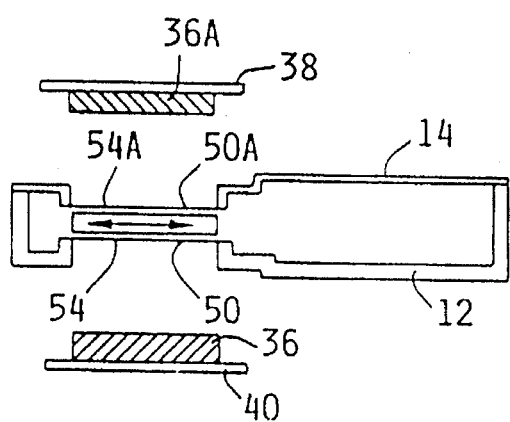
FIG. 8 is a cross-sectional view showing an assembly of the embodiment of FIG. 5, outside of the clean room.

The embodiment shown in FIGS. 5, 6, and 7 can obtain the same effect as in the embodiment shown by FIGS. 1, 2, and 3. It should be noted that in the embodiment of FIGS. 5, 6, and 7 two magnets 36 and 36A are assembled in the outside of the clean room, as shown in FIG. 8.

In the above embodiment, the thin film sheets 54 and 54A are made of non-magnetic material, but a weak magnetic substance such as aluminum can also be used. The use of strong magnetic substances is not desired, because placing a strong magnetic substance in between the coil 32 and magnet 36 or 36A might create a deficiency in the supply of magnetic flux to the coil 32, and then, an even distribution of magnetic flux over the area of movement of the coil 32 cannot be maintained.

Further, in the above embodiment, the enclosure 10 is comprised of the upper cover 14, the bottom casing 12, and the thin film sheet 54 (and 54A), but, the bottom casing 12 and thin film sheet 54 (and 54A) can be made in one piece from the same material such as plastic.

Additionally, though the above embodiment uses the rotary VCM, the present invention can also be applied to a linear VCM using flat magnets.

Advantageously, the disk apparatus of the present invention requires no additional independent parts for isolating the coil from the magnet, and is able to use the rotary VCM.

Further, according to the present invention, the disk apparatus which isolates the coil from the magnet can be easily manufactured.

What we claim is:

1. A disk drive apparatus for storing information comprising:

a housing providing a base for mounting components of said disk drive;

at least one disk rotatably mounted on said housing;

an actuator attached to said housing, said actuator having a first end and a second end, and pivoting about an axis parallel to the axis of rotation of said disk;

a head attached to said first end of said actuator;

a coil attached to the second end of said actuator;

a first permanent magnet for creating a magnetic field surrounding said coil, said field used for positioning said actuator;

wherein said housing has a first through hole opening therein near said coil, said first permanent magnet being positioned within and substantially filling said first through hole opening, said first permanent magnet being attached to said housing.

2. The disk drive apparatus of claim 1, further comprising:

a second permanent magnet for creating said magnetic field surrounding said coil;

wherein said housing has a second through hole opening therein near said coil on a side opposite the first through hole opening, said second permanent magnet being positioned within and substantially filling said second through hole opening, said second permanent magnet being attached to said housing.

3. The disk drive apparatus of claim 2, further comprising:

a first thin film sheet covering said first through hole opening between said coil and said first permanent magnet, said first thin film sheet being thin in relation to the thickness of said housing;

a second thin film sheet covering said second through hole opening between said coil and said second permanent magnet, said second thin film sheet being thin in relation to the thickness of said housing.

4. The disk drive apparatus of claim 1, further comprising:

a thin film sheet covering said first through hole opening between said coil and said first permanent magnet, said thin film sheet being thin in relation to the thickness of said housing.

* * * * *